US009124373B2

(12) United States Patent
Aflatouni et al.

(10) Patent No.: US 9,124,373 B2
(45) Date of Patent: Sep. 1, 2015

(54) INTEGRATED OPTICAL PHASED ARRAY

(71) Applicant: California Institute of Technology, Pasadena, CA (US)

(72) Inventors: Firooz Aflatouni, Pasadena, CA (US); Behrooz Abiri, Pasadena, CA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 120 days.

(21) Appl. No.: 13/684,018

(22) Filed: Nov. 21, 2012

(65) Prior Publication Data
US 2013/0322892 A1 Dec. 5, 2013

Related U.S. Application Data

(60) Provisional application No. 61/562,329, filed on Nov. 21, 2011.

(51) Int. Cl.
*H04B 10/50* (2013.01)
*H04B 10/548* (2013.01)
*H04B 10/25* (2013.01)
*H04B 10/60* (2013.01)

(52) U.S. Cl.
CPC .......... *H04B 10/548* (2013.01); *H04B 10/2504* (2013.01); *H04B 10/501* (2013.01); *H04B 10/50577* (2013.01); *H04B 10/60* (2013.01)

(58) Field of Classification Search
CPC ............... H04B 10/5057; H04B 10/50577; H04B 10/506; H04B 10/501; H04B 10/548; H04B 10/60
USPC ........................... 398/116, 118, 123, 185, 188
See application file for complete search history.

(56) References Cited

U.S. PATENT DOCUMENTS

| 7,095,925 | B2 | 8/2006 | Grunnet-Jepson et al. |
| 7,756,169 | B2 | 7/2010 | Livingston et al. |
| 2004/0161239 | A1* | 8/2004 | Bruesselbach et al. ....... 398/131 |
| 2007/0206958 | A1* | 9/2007 | Chen et al. ................... 398/183 |
| 2010/0054756 | A1* | 3/2010 | Nishihara et al. ............ 398/185 |
| 2010/0187442 | A1 | 7/2010 | Hochberg et al. |

(Continued)

FOREIGN PATENT DOCUMENTS

WO 2013/078435 A1 5/2013

OTHER PUBLICATIONS

International Search Report and Written Opinion for PCT International Patent Application No. PCT/US2012/066426, mailed on Feb. 28, 2013, in 9 pages.

(Continued)

*Primary Examiner* — Leslie Pascal
(74) *Attorney, Agent, or Firm* — Ardeshir Tabibi, Esq.; Alston & Bird LLP

(57) ABSTRACT

An integrated optical phased array includes an input channel receiving an optical input signal, and a multitude of signal processing channels each adapted to supply an associated optical output signal along a first axis in response to the input signal. Each signal processing channel includes, in part, a phase modulator adapted to modulate the phase of the signal travelling through the channel, thereby to control or steer the output signal of the phased array. Each channel optionally includes first and second photo detection circuits respectively generating first and second detection signals. The first and second detection signals in each channel may be used to modulate the amplitude and/or phase of the output signal of that channel thereby to control and steer the output signal of the phased array.

26 Claims, 10 Drawing Sheets

(56) References Cited

U.S. PATENT DOCUMENTS

2011/0052114 A1* 3/2011 Bernasconi et al. ............. 385/3
2012/0177385 A1* 7/2012 Guha ........................... 398/202

OTHER PUBLICATIONS

J. K. Doylend et al., "Two-dimensional free-space beam steering with an optical phased array on silicon-on-insulator", Optics Exmpress, vol. 19, No. 22, Oct. 24, 2011, 10 pages.

Klaus H. Kudielka et al., "Adaptive Telescope Arrays for Laser Communications and Astronomy", Adaptive Optics, ESO Conference and Workshop Proceedings, Oct. 2-6, 1995, pp. 427-432.

International Preliminary Report on Patentability for PCT Application No. PCT/US2012/066426 mailed Jun. 5, 2014, 8 pages.

* cited by examiner

INTEGRATED OPTICAL PHASED ARRAY

CROSS-REFERENCE TO RELATED APPLICATIONS

The present application claims benefit under 35 USC 119 (e) of U.S. provisional application No. 61/562,329, filed Nov. 21, 2011, entitled "Integrated Optical Phased Arrays", the content of which is incorporated herein by reference in its entirety.

FIELD OF THE INVENTION

The present invention is related to phased arrays, and more particularly to an integrated optical phase array.

BACKGROUND OF THE INVENTION

RF and mm-wave phased arrays are being increasingly used in a variety of applications, such as communication, imaging, beam steering, and radar. However, efforts in developing optical phased arrays have had limited success.

Conventional optical phased arrays are formed using such techniques as injection locking of lasers in the array, single laser with array of phase modulators, and phase locking of multiple semiconductor lasers. However, conventional optical phased arrays have a number of disadvantages. For example, they are formed using bulky optical components, require complex control systems to minimize the effect of environment fluctuations, consume a significant area, and are otherwise difficult to scale.

A need continues to exist for an optical phased array that is highly integrated, has a reduced sensitivity to environment fluctuations, and consumes a significantly smaller area than conventional optical phased arrays.

BRIEF SUMMARY OF THE INVENTION

An integrated optical phased array, in accordance with one embodiment of the present invention includes, in part, an input channel adapted to receive an optical input signal, and a multitude of signal processing channels each adapted to supply an optical output signal along a first axis in response to the input signal. Each signal processing channel includes a phase modulation block adapted to modulate a phase of the signal travelling through that channel in response to a control signal received by that channel.

A method of steering an output optical signal, in accordance with one embodiment of the present invention, includes, in part, delivering an optical input signal to an input channel of a phased array, and modulating a phase of an optical signal travelling through each of a multitude of channels in response to a control signal received by the channel. The optical signal travelling through each channel is defined by the input signal. The output optical signal is defined by the plurality of phase modulated signals of the plurality of channels.

An integrated optical phased array, in accordance with one embodiment of the present invention includes, in part, an input channel adapted to receive an optical input signal, and a multitude of signal processing channels each adapted to supply an associated optical output signal in response to the input signal along a first axis. Each signal processing channel further includes, in part, first and second photo detection circuits, a first signal modulation block, and a phase modulation block.

The first photo detection circuit is adapted to generate a first detection signal in response to a first optical signal travelling through a first optical path in the channel. The second photo detection circuit is adapted to generate a second detection signal in response to a second optical signal travelling through a second optical path in the channel. The first signal modulation block is adapted to modulate an amplitude of a third optical signal travelling a third optical path in the channel in response to the first detection signal. The phase modulation block is adapted to modulate a phase of a fourth optical signal travelling a fourth optical path in the channel in response to the second detection signal. The second optical signal is generated by splitting and routing the input signal.

In one embodiment, the first signal modulation block of at least one channel modulates an amplitude of the channel's associated third optical signal by varying a phase of the channel's associated third optical signal. In one embodiment, the first and fourth optical signals of at least one channel are generated from a fifth optical signal travelling through that channel.

In one embodiment, each channel further includes, in part, a first control circuit adapted to receive the channel's associated first detection signal and apply a first control signal to the channel's associated amplitude modulation block to modulate the amplitude of the channel's associated third optical signal. In one embodiment, each channel further includes, in part, a second control circuit adapted to receive the channel's associated second detection signal and apply a second control signal to the channel's associated phase modulation block to modulate the phase of the channel's associated fourth optical signal.

In one embodiment, the first optical signal of at least one channel is generated from that channel's associated third optical signal. In another embodiment, the first and fourth optical signals of at least one channel have substantially similar phases and different amplitudes. In one embodiment, the second optical signal of at least one channel is further defined by an output signal of the channel's associated phase modulation block.

In one embodiment, the first optical signal of at least one channel is generated from the channel's associated third and fourth optical signals. In one embodiment, the third and fourth optical signals of at least one channel have substantially similar phases. In one embodiment, the third and fourth optical signals of at least one channel are generated by splitting a fifth signal travelling through that channel.

In one embodiment, the first photo detection circuit of at least one channel is a photo diode. In one embodiment, the second photo detection circuit of at least one channel is a photo diode. In one embodiment, the integrated optical phased array further includes, in part, a second multitude of signal processing channels positioned above the first plurality of signal processing channels. In yet another embodiment, the integrated optical phased array further includes a third multitude of signal processing channels positioned below the first multitude of signal processing channels.

In accordance with one embodiment of the present invention, a method of steering an optical signal includes, in part, varying relative phases of a multitude of output signals generated by a first multitude of optical signal processing channels. To achieve this, the method includes, in part, delivering an optical input signal to an input channel, generating a first detection signal in response to a first optical signal travelling through a first optical path of each processing channel, generating a second detection signal in response to a second optical signal travelling through a second optical path of each processing channel, modulating the amplitude of a third optical signal travelling through a third optical path of each processing channel in response to the associated first detection signal, modulating the phase of a fourth optical signal travelling through a fourth optical path of each processing channel in response to the associated second detection signal, and generating the second optical signal by splitting and routing the optical input signal.

In accordance with one embodiment, the method further includes, in part, modulating the amplitude of the third optical signal by varying the phase of the third optical signal. In accordance with one embodiment of the present invention, the method further includes, in part, splitting the fifth signal to generate the first and fourth optical signals. In accordance with one embodiment of the present invention, the method further includes, in part, generating a first control signal in response to the first detection signal, and modulating the amplitude of the third optical signal in response to the first control signal.

In accordance with one embodiment, the method further includes, in part, generating a second control signal in response to the second detection signal, and modulating the phase of the fourth optical signal in response to the second control signal.

In accordance with one embodiment, the method further includes, in part, generating the first optical signal from the third optical signal. In accordance with another embodiment, the method further includes, in part, maintaining the first and fourth optical signals substantially in phase. In accordance with yet another embodiment, the method further includes, in part, generating the second optical signal in accordance with the phase modulated fourth optical signal.

In accordance with one embodiment, the method further includes, in part, coupling the third and fourth optical signals to generate the first optical signal. In accordance with one embodiment, the method further includes, in part, maintaining the third and fourth optical signals substantially in phase. In accordance with one embodiment, the method further includes, in part, splitting a fifth optical signal to generate the third and fourth optical signals.

In accordance with one embodiment, the method further includes, in part, generating the first detection signal using a first photo diode. In accordance with one embodiment, the method further includes, in part, generating the second detection signal using a second photo diode. In accordance with one embodiment, the method further includes, in part, forming a second multitude of signal processing channels above the first multitude of signal processing channels. In accordance with one embodiment, the method further includes, in part, forming a third multitude of signal processing channels below the first multitude of signal processing channels.

DETAILED DESCRIPTION OF THE INVENTION

In accordance with one embodiment of the present invention, the output signal of an optical phased array may be steered and/or controller or manipulated by varying relative phases of the optical signals travelling through parallel signal processing channels of the optical phased array. Accordingly, each processing stage includes a phase modulation block that may be independently controlled to steer the output signal of the phased array.

In accordance with another embodiment of the present invention, the output signal of an optical phased array may be steered and/or controller or manipulated by varying relative phases and/or amplitudes of the optical signals travelling through parallel signal processing channels of the optical phased array. Each processing stage includes amplitude and phase modulation blocks that may be independently controlled to steer the output signal of the phased array.

Figure 1:
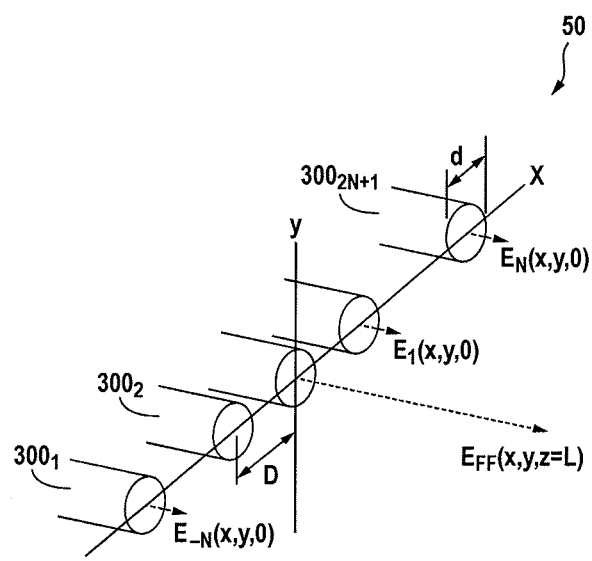
FIG. 1 shows a one-dimensional array of collimated optical signals.

FIG. 1 shows a one-dimensional optical phased array 50 having 2N+1 collimated optical signals $300_1$, $300_2$ ... $300_{(2N+1)}$ travelling along the z axis. Each optical signal (alternatively referred to herein as beam) is shown as having a diameter d, and spaced away from an adjacent beam by distance D along the x-axis. Assume that each beam has a Gaussian profile, and has the same wavelength $\lambda_0$ with the same optical power $P_0$. Accordingly, the electric field at the point of emission for each beam may be obtained using the following expression:

$$E_n(x, y, 0) = E_0 e^{jn\phi} e^{\frac{-4}{d^2}[(x-nD)^2+y^2]} \tag{1}$$

where $E_0$, n, and $\phi$ are respectively the electric field constant, element index, and the constant phase difference between adjacent elements.

Applying the Fraunhofer far field approximation, the far field intensity of the electric field at distance z=L may be determined using the following:

$$I(x, y, L) = \frac{E_0^2 d^4}{\lambda_0^2 L^2} \left| W\left(\frac{2\pi d}{\lambda_0 L}x, \frac{2\pi d}{\lambda_0 L}y\right) \right|^2 \left| G\left(\frac{2\pi D}{\lambda_0 L}x - \phi\right) \right|^2 \tag{2}$$

where $$W(k_x, k_y) = F\left[e^{\frac{-4}{d^2}[(x-nD)^2+y^2]}\right],$$

$G(\Omega) = \sum_{n=-N}^{N} e^{-jn\Omega}$, and $\mathcal{F}$ represents the 2D Fourier transform, respectively. Expression (2) may be further simplified to:

$$I(x, y, L) = \frac{E_0^2 d^4 \pi^2}{16\lambda_0^2 L^2} e^{\frac{-\pi^2 d^2}{2\lambda_0^2 L^2}(x^2+y^2)} \times \frac{\sin^2\left[(2N+1)\frac{\pi D}{\lambda_0 L}x - \frac{\phi}{2}\right]}{\sin^2\left[\frac{\pi D}{\lambda_0 L}x - \frac{\phi}{2}\right]} \quad (3)$$

As is seen from expression (3), the electric field intensity of at any point L may be varied by varying $\phi$, which is the difference between phases of adjacent beams. The Fourier transform of the profile of the individual beams defines the envelope (proportional to $$\frac{\lambda_0 L}{d})$$

within which the beam may be steered.

Due to finite size of the optical phased array 50 and periodic nature of $G(\Omega)$, side lobes appear in the far field pattern. The position of the main lobe and the position of its adjacent side lobes may be calculated from Expression 3. The ratio between the main lobe and the adjacent side lobe, commonly referred to as the side lobe suppression ratio (SLSR), may be calculated using the following expression:

$$SLSR = \frac{I(x_{main}, y, L)}{(x_{side}, y, L)} \quad (4)$$

Using Expressions 3 and 4, the substantially maximum steering angle for a given SLSR may be defined as:

$$\Phi_{max} = \left[1 - \frac{2}{\pi^2}\left(\frac{D}{d}\right)\ln(SLSR)\right]\pi \quad (5)$$

Figure 2A:
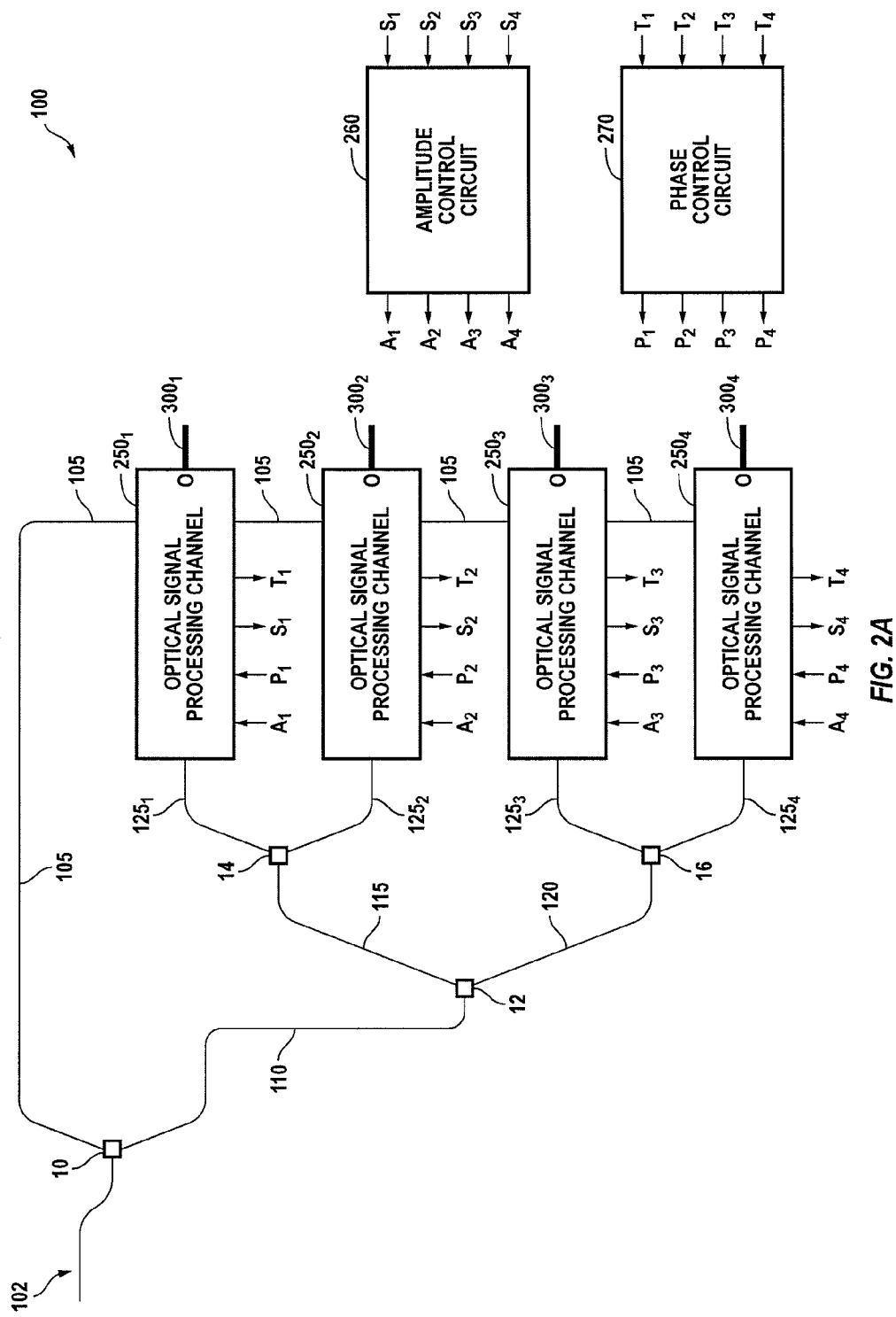
FIG. 2A is a simplified block diagram of a multi-channel integrated optical phased array, in accordance with one exemplary embodiment of the present invention.

FIG. 2A is a block diagram of a 4-channel integrated optical phased array (alternatively referred to herein as phased array) 100, in accordance with one exemplary embodiment of the present invention. Although integrated optical phased array 100 is shown as including 4 channels, it is understood that an integrated optical phased array, in accordance with embodiments of the present invention, may have any number of channels N, where N is an integer greater than 1. A phased array having (2N+1) channels, in accordance with embodiments of the present invention, may generate the (2N+1) beams shown in FIG. 1.

Phased array 100 is shown as including, in part, an input channel 102 and four signal processing channels $250_1$, $250_2$, $250_3$, $250_4$. Phased array 100 is adapted to receive an incoming signal via input channel 102 and in response generate four output signals $300_1$, $300_2$, $300_3$, $300_4$ delivered respectively from signal processing channels $250_1$, $250_2$, $250_3$, $250_4$. Each of the output signals $300_1$, $300_2$, $300_3$, $300_4$ may be delivered by a different emitter (not shown). Each emitter may be a waveguide, a grating coupler, edge couplers, or the like.

As is described further below, in accordance with embodiments of the present invention, by varying the phases of the optical signals travelling through adjacent channels, the output optical signal of phased array 100, which is the result of combination of or interference between signals $300_1$, $300_2$, $300_3$, $300_4$, may be steered in different directions. Phased array 100 is also shown as including, in part, an amplitude control circuit 260 and a phase control circuit 270, described further below. In one embodiment, phased array 100, amplitude control circuit 260 and phase control circuit 270 are formed on the same substrate, such as a semiconductor substrate. In another embodiment, phased array 100, amplitude control circuit 260 and phase control circuit 270 may be formed on different substrates.

Figure 3A:
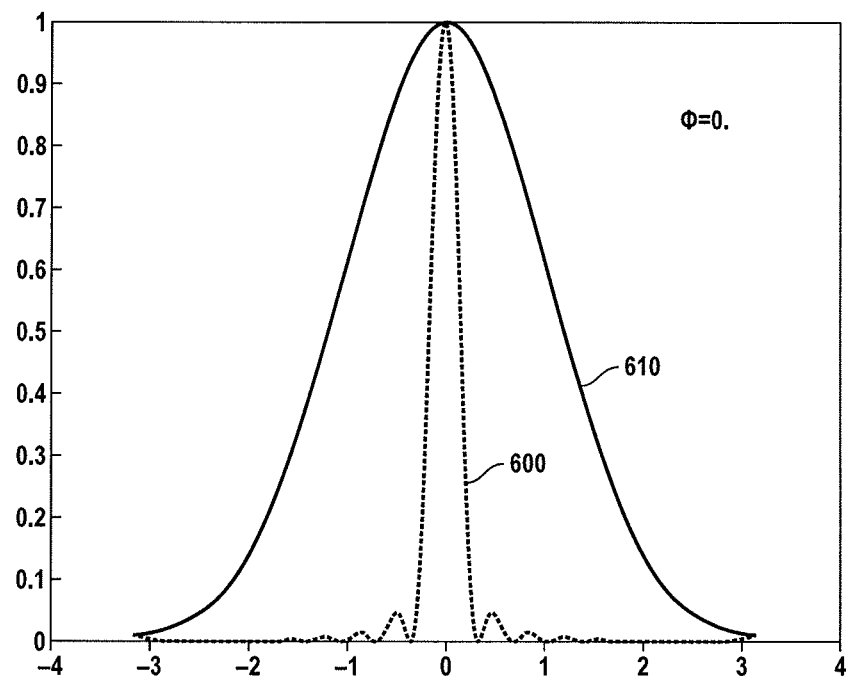
FIGS. 3A-3D show calculated far field pattern of the output signal of the optical phased array of FIG. 2 for different phase shifts between adjacent channels.

FIGS. 3A-3D show the calculated far field pattern of the output signal of phased array 100 for different phase shifts between adjacent channels $250_1$, $250_2$, $250_3$, $250_4$. In FIG. 3A, the difference between phases of the output signals $300_1$, $300_2$, $300_3$, $300_4$ is set to zero. Plot 600 of FIG. 3A is the profile of the output signal of phased array 100. Plot 610 is the envelope within which the output signal profile of the phased array may vary. As is seen from FIG. 3A, when the difference between phases of the output signals of adjacent channels is substantially zero, the output signal of phased array 100 is positioned within the center of the envelop 610.

Figure 3B:
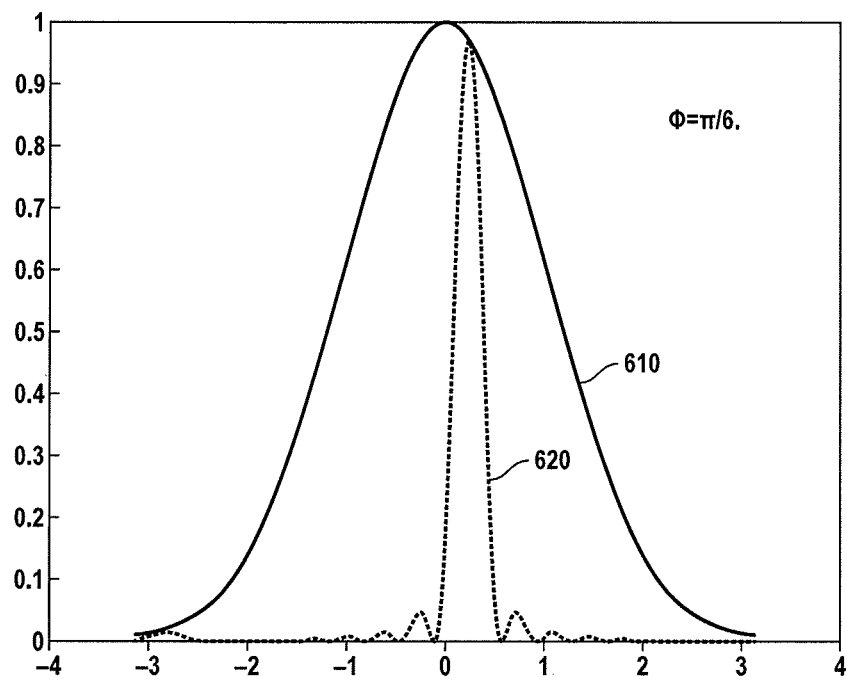
Figure 3C:
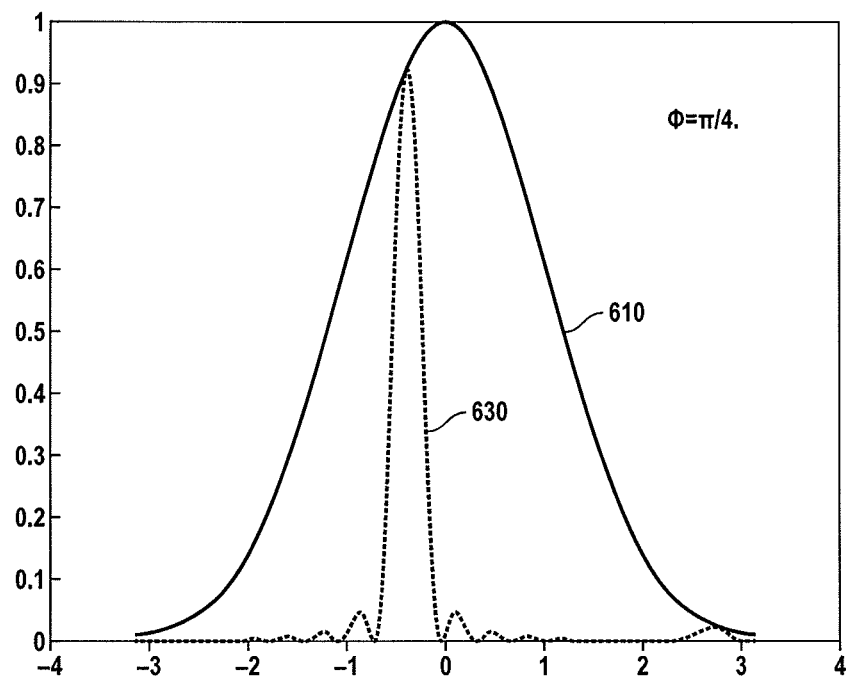
Figure 3D:
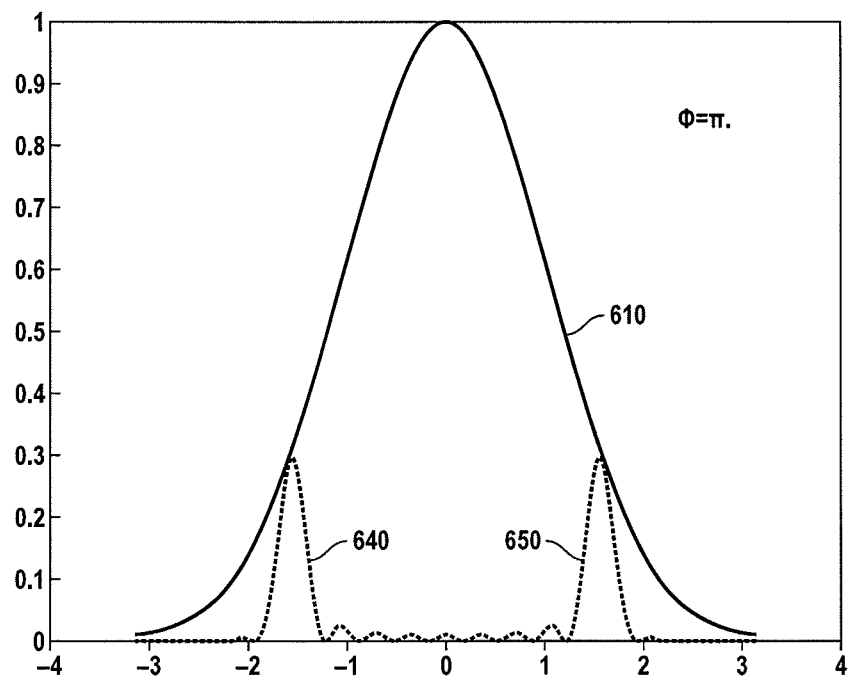

In FIG. 3B, the difference between phases of the output signals of adjacent channels, e.g., channels $250_1$, $250_2$, channels $250_2$, $250_3$, and channels $250_3$, $250_4$ is set to $\pi/6$. Accordingly, in FIG. 3B, the output signal of phased array 100 has a profile 620 that is shifted to the right relative to profile 610 of FIG. 3A. In FIG. 3C, the difference between phases of the output signals of adjacent channels is set to $\pi/4$. Accordingly, in FIG. 3C, the output signal of phased array 100 has a profile 630 that is shifted to the left relative to profile 610 of FIG. 3A. In FIG. 3D, the difference between phases of the output signals of adjacent channels is set to $\pi$. As is seen from FIG. 3D, when the phase difference between adjacent channels is $\pi$, the output signal of phased-array 100 has two beam profiles, namely profiles 640 and 650. Therefore, in accordance with embodiments of the present invention, by varying the phase difference of the output signals of adjacent channels, the output signal of phased array 100 may be steered in different directions.

Figure 4A:
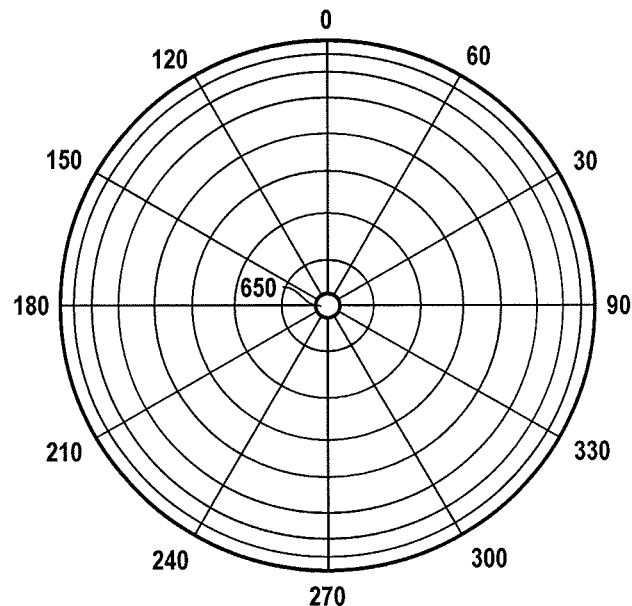
FIGS. 4A-4D are top views of calculated far field pattern of the output signal of the optical phased array of FIG. 2 for different phase shifts between adjacent channels.

FIGS. 4A-4D are top views of the calculated far field pattern of the output signal of the optical phased array 100 for different phase shifts between adjacent channels. FIGS. 4A, 4B, 4C, and 4D are generated with the same data used in generating FIGS. 3A, 3B, 3C and 3D. In FIG. 4A, the difference between phases of the output signals $300_1$, $300_2$, $300_3$, $300_4$ is set to zero. Accordingly, in FIG. 4A, the output signal of phased array 100 is positioned at phase array center element 650, as was also shown in FIG. 3A.

Figure 4B:
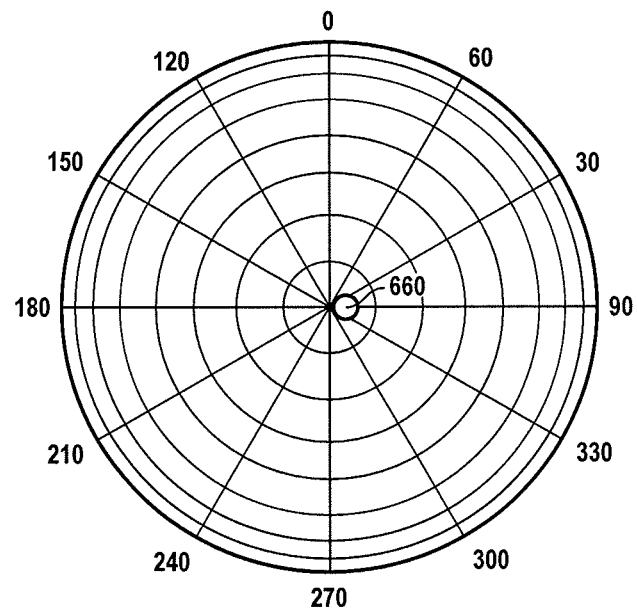
Figure 4C:
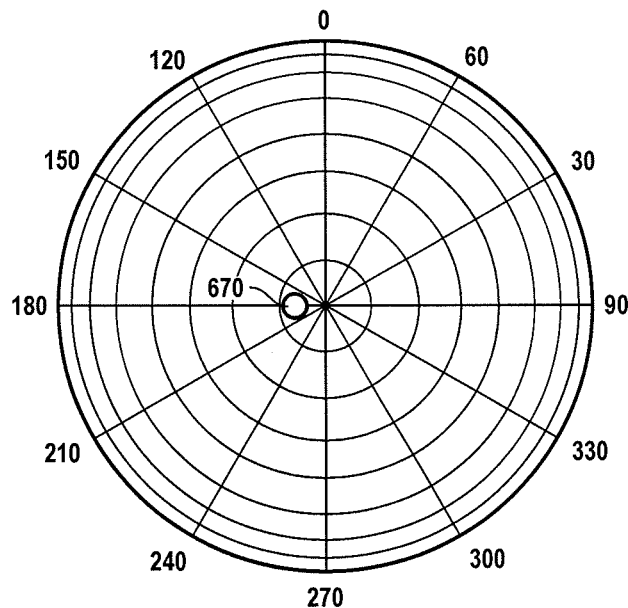
Figure 4D:
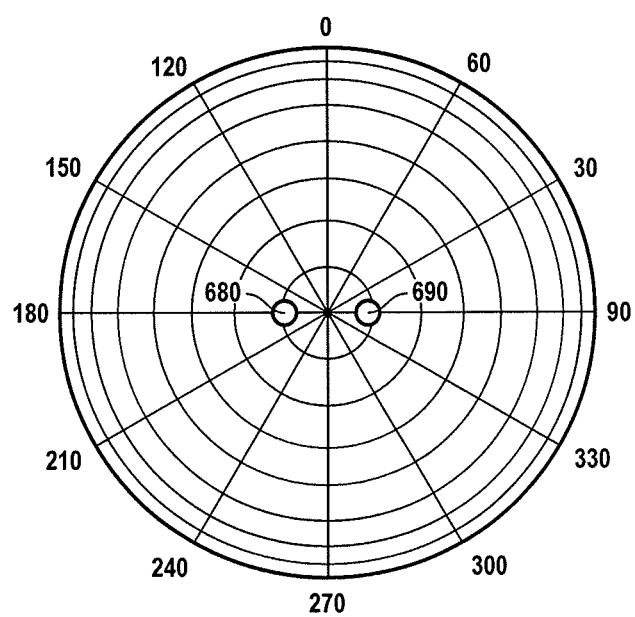

In FIG. 4B, the difference between phases of the output signals of adjacent channels is set to $\pi/6$. Accordingly, in FIG. 4B, the output signal of phased array 100 is positioned to the right 660 of center 650, as was also shown in FIG. 3B. In FIG. 4C, the difference between phases of the output signals of adjacent channels is set to $\pi/6$. Accordingly, in FIG. 4C, the output signal of phased array 100 is positioned to the left 670 of center 650, as was also shown in FIG. 3C. In FIG. 4D, the difference between phases of the output signals of adjacent channels is set to $\pi$. Accordingly, in FIG. 4D, the output signal of phased-array 100 has two beam profiles, with one profile being positioned to the left 680 of center 650 and another profile being positioned to the right 690 of center 650, as was also shown in FIG. 3D.

In the following, for simplicity, the same reference number may be used to identify both the optical path through which an optical signal travels, as well as to the optical signal which travels through that path. For example, reference numeral 102 may be used to refer to the optical path so identified in FIG. 2A, or alternatively to the optical signal that travels through this path. Furthermore, in the following, the terms power divider, power splitter, coupler, or combiner are alternatively used to refer to an optical element adapted to split/divide a signal to generate more signals and/or couple/combine a multitude of optical signals to generate one or more signals. Such a component is also alternatively referred to herein as splitter/coupler.

Referring to FIG. 2A, the optical signal traveling through path 102, which is formed in a substrate such as a semiconductor substrate, is split using splitter/coupler 10 to form two optical signals travelling through optical paths 105, 110. In one embodiment, splitter/coupler 10 is adapted to split and deliver 10% of the power of the incoming signal 102 to optical path (referred to herein alternatively as path) 105 and the remaining 90% of the incoming signal power to path 110. In other embodiments, splitter/coupler 10 may split the power of incoming signal 102 using different ratios. For example, in one embodiment, splitter/coupler 10 may deliver 20% of the power of the incoming signal 102 to path 105 and the remaining 80% of the incoming signal power to path 110.

The optical signal travelling though path 110 is split into two optical signals delivered to paths 115 and 120 via splitter/coupler 12. In the exemplary embodiment of the integrated optical phased array 100, splitter/coupler 12 is shown as dividing the signal it receives into two signals having equal amplitudes and phases. It is understood however that in other embodiments, the optical signals delivered by splitter/coupler 12 to paths 115 and 120 may have different amplitudes and/or phases.

The optical signal travelling though path 115 is split by splitter/coupler 14 into two optical signals having equal amplitudes/phases and delivered to paths $125_1$ and $125_2$. Likewise, the optical signal travelling though path 120 is split by splitter/coupler 16 into two optical signals having equal amplitudes/phases and delivered to paths $125_3$ and $125_4$. While in the exemplary embodiment of the integrated optical phased array 100, each splitter/coupler is shown as dividing the optical signals it receives into two optical signals with equal amplitudes and phases, it is understood that in other embodiments, different splitter/couplers may split the signals they receive into signals having different amplitudes and/or phases. The signals travelling through optical paths $125_1$, $125_2$, $125_3$ and $125_4$ are respectively delivered to signal processing channels $250_1$, $250_2$, $250_3$ and $250_4$. In another embodiment, the optical signal 110 is directly split into four signals traveling through optical path $125_1$, $125_2$, $125_3$ and $125_4$.

Figure 2B:
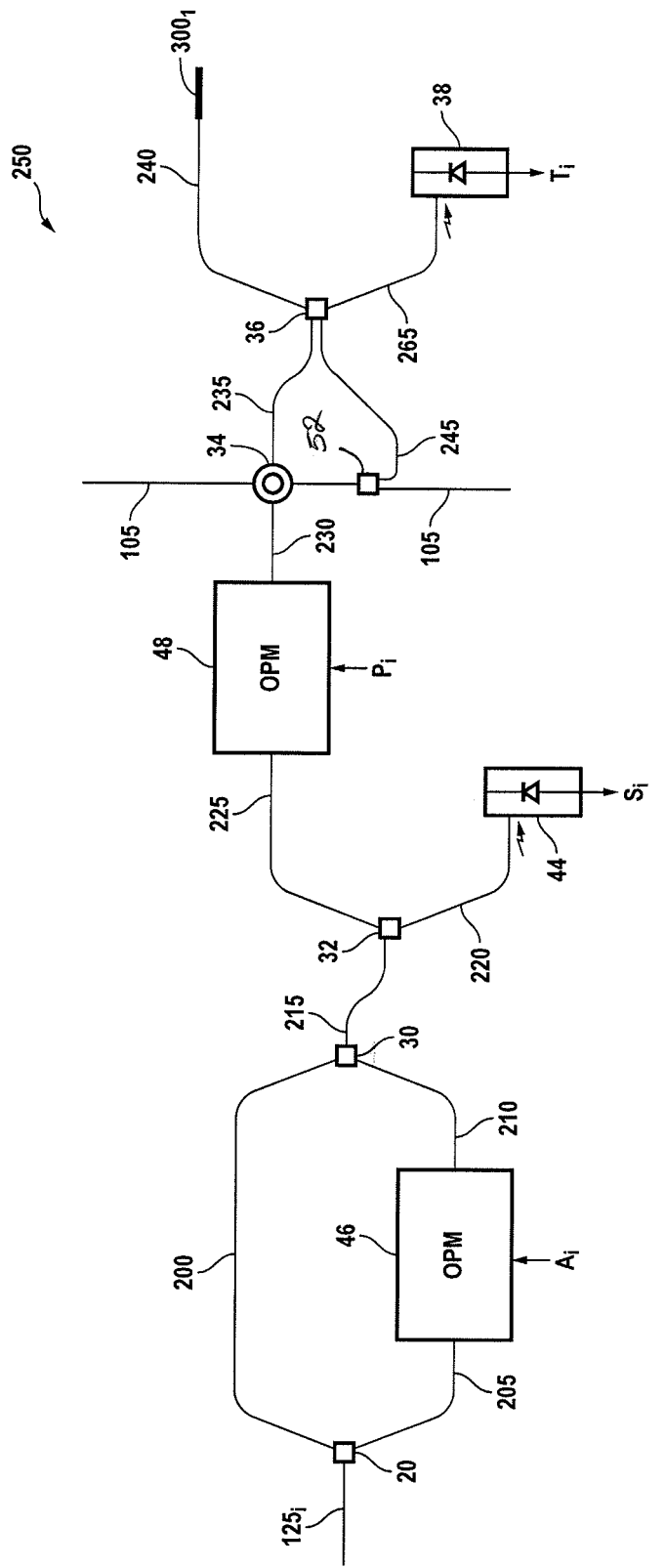
FIG. 2B is a simplified block diagram of a signal processing channel of the integrated optical phased array of FIG. 2A, in accordance with one exemplary embodiment of the present invention.

FIG. 2B is a simplified block diagram of each of the processing channel $250_i$, where i is an integer varying from 1 to 4. Each processing channels $250_i$ is alternatively referred to as processing channel 250. As seen from FIG. 2B, each processing channel $250_i$ is shown as including, in part, splitters/couplers 20, 30, 32, 36, 52 a waveguide crossing 34, optical phase modulators 46, 48, and photo detection circuits 38, 44.

Power divider 20 is adapted to split the optical signal travelling through path $125_i$ into two signals delivered to paths 200, 205. Since the optical signals entering paths 200 and 205 have the same phase and power, and assuming normalized power, they both may be described as $$\frac{1}{\sqrt{2}} e^{-j\omega t},$$

where ω the frequency of the optical signal travelling through paths 200, 205. Optical phase modulator 46 is adapted to change the phase of the optical signal it receives from path 205 by φ. Accordingly, the phase of the optical signal supplied to path 210 by optical phase modulator 46 is defined as:

$$\frac{1}{\sqrt{2}} e^{-j(\omega t + \phi)}.$$

Power divider 30 is adapted to combine the optical signals it receives from paths 200, 210 to generate and deliver to path 215 an optical signal defined by:

$$\frac{1}{\sqrt{2}} \{e^{-j\omega t} + e^{-j(\omega t + \phi)}\} \quad (6)$$

Accordingly, as is seen from expression (6), by modulating the phase φ using optical phase modulator 46, the amplitude of the optical signal delivered to path 215 may be varied. Phase modulator 46 may be a traveling wave phase modulator (e.g., a distributed p-i-n ridge waveguide structure), a ring resonator based phase modulator, or any other optical phase modulator.

Coupler 32 is adapted to split the optical signal it receives from path 215 into two signals delivered to paths 220 and 225. In one embodiment, 10% of the optical signal traveling through path 215 is delivered to path 220 and the remaining 90% is delivered to path 225. In other embodiments, a different ratio of the optical signal travelling through path 215 is delivered to paths 220, 225. The optical signal travelling through path 220 is received by photo detection circuit 44. In the exemplary embodiment shown in FIG. 2B, photo detection circuit 44 is shown as being a photo detector, such as a photo-diode, and is alternatively referred to hereinbelow as photo detector 44. It is understood, however, that a photo detection circuit may be formed using other components. In response to the received optical signal, photo detector 44 generates an electrical current $S_i$ delivered to amplitude control circuit 260 (see FIG. 2A). Since the exemplary embodiment of the phased array shown in FIGS. 2A, 2B includes four processing channels, four such current signals, namely $S_1$, $S_2$, $S_3$, $S_4$ are generated and delivered to amplitude control circuit 260. It is understood, however, that in a phased array having N processing channels, where N is an integer greater than 1, N such current signals, namely $S_1, S_2 \ldots S_N$ are received by amplitude control circuit 260.

In response to signal $S_i$, amplitude control circuit 260 generates and applies an electrical signal $A_i$ to optical phase modulator 46 to control the phase and thus the amplitude of the signal that optical phase modulator 46 delivers to path 210. Since the exemplary embodiment of the phased array shown in FIGS. 2A, 2B includes four processing channels, four such control signals, namely $A_1$, $A_2$, $A_3$, $A_4$ are generated, with each such signal being applied to an optical phase modulator 46 disposed in a different one of the optical processing channels. It is understood, however, that in a phased array having N processing channels, where N is an integer greater than 1, N such control signals, namely $A_1, A_2 \ldots A_N$ are generated by amplitude control circuit 260 in response to receipt of N output signals $S_1, S_2 \ldots S_N$ of N photo detectors 44.

In one embodiment, amplitude control circuit 260 and integrated optical phase array 100 are formed on the same substrate. In another embodiment, amplitude control circuit 260 and integrated optical phase array 100 are formed on different substrates. Consequently, in accordance with embodiments of the present invention, the phase/amplitude of the optical signal delivered to path 215 of each signal processing channel of the integrated optical phased array may be independently controlled and varied to achieve the desired degree of phase separation between output signals $300_1$, $300_2$, $300_3$ and $300_4$.

Optical phase modulator 48 is adapted to modulate the phase of the optical signal it receives from path 225 in accordance with signal $P_i$ it receives from phase control circuit 270 and to deliver the phase modulate signal to path 230, as described further below. Consequently, the optical signals travelling through paths 225, 230 have a phase separation, θ, set by optical phase modulator 48. Accordingly, both the amplitude as well as the phase of the signal travelling through path 230 may be varied using optical phase modulators 46, and 48.

Waveguide-crossing 34 together with coupler 52 are adapted to deliver (i) a portion of the incoming optical signal travelling through 105 to path 245, and (ii) the optical signal travelling through path 230 to path 235. The optical signals travelling through paths 235, 245 are received by splitter/coupler 36 which is adapted to couple these optical signals in accordance with a predefined ratio. For example, in one embodiment, splitter/coupler 36 couples 10% of the optical signal travelling through path 245 with 90% of the optical signal travelling through path 235. In another embodiment, splitter/coupler 36 couples, for example, 20% of the optical signal travelling through path 245 with 80% of the optical signal travelling through path 235. In one embodiment, waveguide crossing 34 may have any optical loss of less than 0.2 dB and optical cross-talk of less than −40 dB.

A portion of the optical signals coupled by splitter/coupler 36 is supplied as an output optical signal $300_i$ via optical path 240. For example, assume that the signal travelling through path 245 is represented by:

$$be^{-j\omega t}$$

where b and ω respectively represent the amplitude and phase of the signal travelling through path 245.

Assume further that the signal travelling through path 235 is represented by:

$$j\alpha e^{-j(\omega t+\theta)}$$

where jα and (ω+θ) respectively represent the amplitude and phase of the signal travelling through path 235. Assuming that splitter/coupler 36 is adapted to couple 10% of the optical signal travelling through path 245 with 90% of the optical signal travelling through path 235, the optical signal $300_i$ delivered to path 240 may be defined by:

$$\frac{b}{\sqrt{10}}e^{-j\omega t} + j\frac{a}{\sqrt{90}}e^{-(\omega t+\theta)} \quad (7)$$

As described above, photo detector 38 receives a portion of the signal represented by expression (7) from path 265 and converts the received optical signal to an electrical current. Since the two components of the signal represented by the two terms in expression (7) have the same frequency ω, the current generated by photo detector 38 is substantially independent of the frequency ω, but is dependent on the amplitudes as well as the phase difference θ of these two signal components. In other words, the current generated by photo detector 38 is defined, in part, by the difference between the phases of the signals travelling through paths 235, 245, which in turn, is defined by the difference between the phase of the signal travelling through paths 230 and 105. Consequently, the current generated by photo detector 38 is representative, in part, of the difference between the phases of signal 230 and the incoming signal 105.

In response to the received optical signal, photo detector 38 generates an electrical current $T_i$ applied to Phase control circuit 270 (see FIG. 2A). Since the exemplary embodiment of the phased array shown in FIGS. 2A, 2B includes four processing channels, four such current signals, namely $T_1$, $T_2$, $T_3$, $T_4$ are generated and applied to phase control circuit 270. It is understood, however, that in a phased array having N processing channels, where N is an integer greater than 1, N such current signals, namely $T_1, T_2 \ldots T_N$ are received by phase control circuit 270.

In response to signal $T_i$ generated and applied by photo detector 38 to phase control circuit 270, phase control circuit 270 generates and applies an electrical signal $P_i$ to optical phase modulator 48 to control the phase of the signal optical phase modulator 48 supplies to path 230. In other words, by varying signal $P_i$ applied to optical phase modulator 48, the phase of the signal delivered to path 230—and hence the phase of the output signal $300_i$—may be modulated.

Since the exemplary embodiment of the phased array shown in FIGS. 2A, 2B includes four processing channels, four such control signals, namely $P_1$, $P_2$, $P_3$, $P_4$ are generated, with each such signal being applied to an optical phase modulator 48 disposed in a different one of the optical processing channels. It is understood, however, that in a phased array having N processing channels, where N is an integer greater than 1, N such control signals, namely $P_1, P_2 \ldots P_N$ are generated by phase control circuit 270 in response to receipt of N output signals $T_1, T_2 \ldots T_N$ of N photo detectors 38.

In one embodiment, phase control circuit 270, amplitude control circuit 260 and integrated optical phase array 100 are formed on the same substrate. In another embodiment, amplitude control circuit 260 and phase control circuit 270 may be formed on a first substrate, and integrated optical phase array 100 may be formed on a second substrate. In yet other embodiments, amplitude control circuit 260 and phase control circuit 270 are parts of the same circuitry.

Consequently, in accordance with embodiments of the present invention, by detecting signals $S_i$, $T_i$ and supplying signals $A_i$, $P_i$, both the amplitude as well as the phase of the output signal $300_i$ associated with each channel $250_i$ may be independently controlled and varied to achieve the desired degree of phase separation and interference between the output signals $300_i$. For example, in one embodiment, both the amplitudes and the phases of the output signals of the channels are varied to be respectively substantially equal to one another. In yet other embodiments, the amplitude and the phase of the output signals of each channel are independently varied to satisfy one or more conditions or achieve a desired result.

Figure 2C:
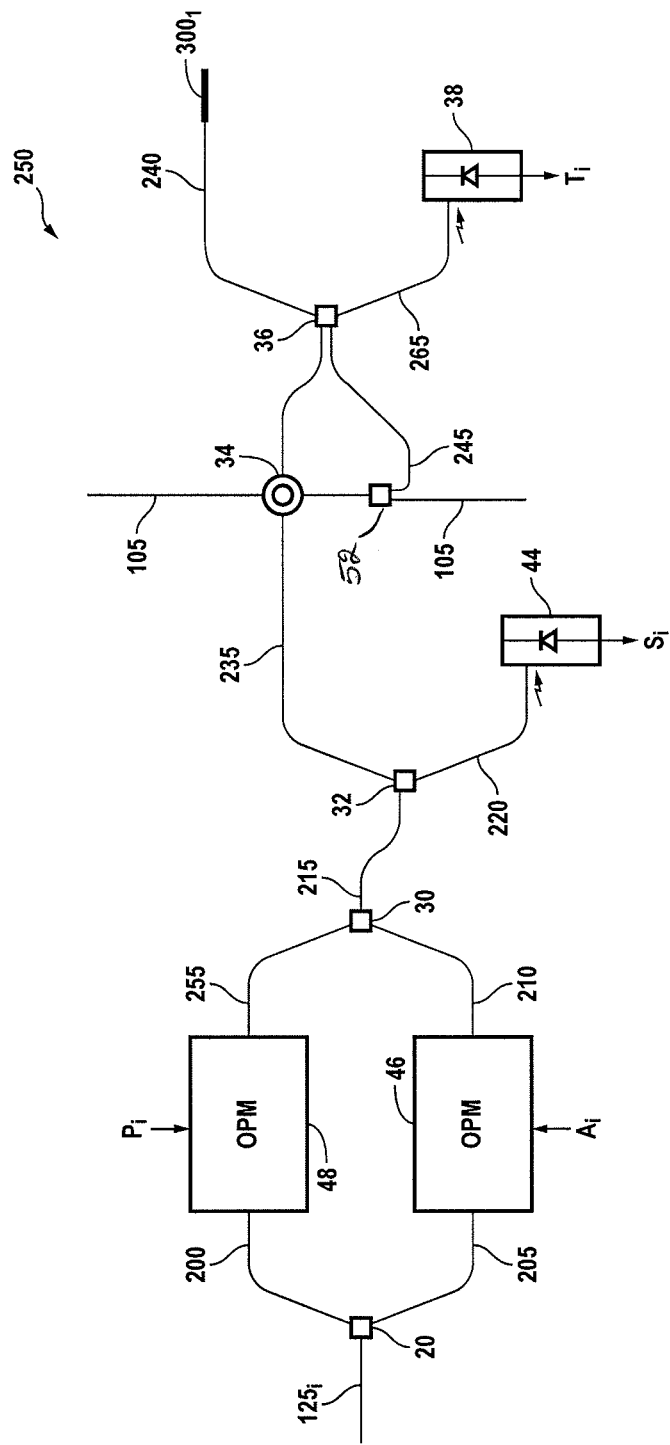
FIG. 2C is a simplified block diagram of a signal processing channel of the integrated optical phased array of FIG. 2A, in accordance with another exemplary embodiment of the present invention.

FIG. 2C is a simplified block diagram of a signal processing channel $250_i$, in accordance with another embodiment of the present invention. The signal processing channel shown in FIG. 2C is similar to the signal processing channel shown in FIG. 2B except that in the signal processing channel shown in FIG. 2C, optical phase modulator 38 is disposed in path 200, whereas in the signal processing channel shown in FIG. 2B, optical phase modulator 48 is disposed between splitter/coupler 32 and waveguide crossing 34.

Referring to FIG. 2C, in response to the optical signal delivered via path 265, photo detector 38 generates and applies an electrical signal $T_i$ to phase control circuit 270 (see FIG. 2A). In response, phase control circuit 270 generates and applies a signal $P_i$ to optical phase modulator 48 to control the phase of the signal optical phase modulator 48 delivers to path 255. Accordingly, by varying signal $P_i$ applied to optical phase modulator 48, the phase of the signal delivered to path 255—and hence the phase of the output signal $300_i$—is modulated.

Consequently, in accordance with embodiments of the present invention, by detecting signals $S_i$, $T_i$ and supplying signals $A_i$, $P_i$, both the amplitude as well as the phase of the output signal $300_i$ associated with each channel $250_i$ may be independently controlled and varied to achieve the desired degree of phase separation and interference between the output signals $300_i$. For example, in one embodiment, both the amplitudes and the phases of the output signals of the channels are varied to be respectively substantially equal to one another. In yet other embodiments, the amplitude and the phase of the output signals of each channel are independently varied to satisfy one or more conditions or achieve a desired result.

Figure 5:
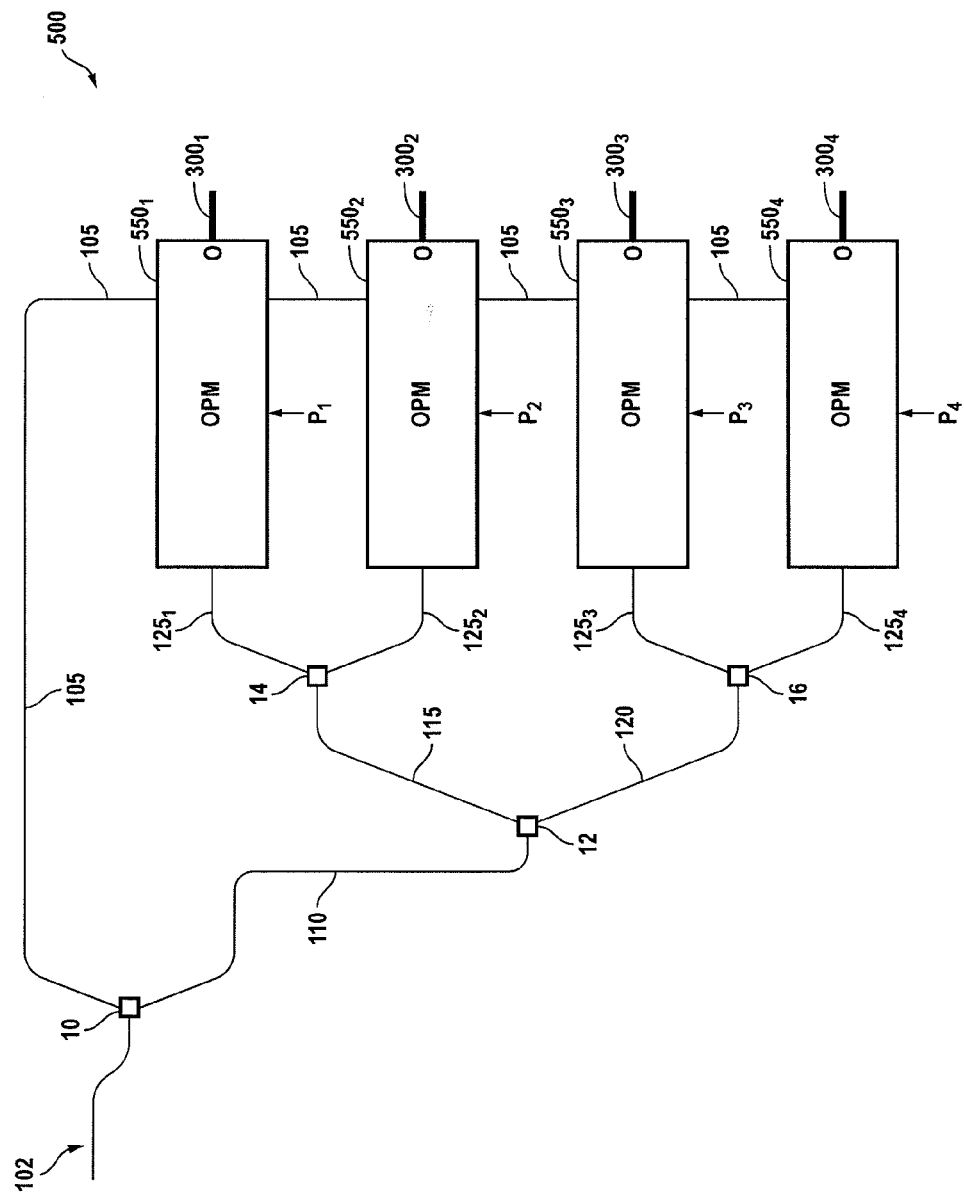
FIG. 5 is a simplified block diagram of a multi-channel integrated optical phased array, in accordance with another exemplary embodiment of the present invention.

FIG. 5 is a block diagram of a 4-channel integrated optical phased array 500, in accordance with another exemplary embodiment of the present invention. Although integrated optical phased array 500 is shown as including 4 channels, it is understood that an integrated optical phased array, in accordance with embodiments of the present invention, may have any number of channels N, where N is an integer greater than 1.

Phased array 500 is shown as including, in part, an input channel 102 and four phase modulators $550_1$, $550_2$, $550_3$, $550_4$ each disposed in a different one of the phase array's output channel. Phased array 500 is adapted to receive an incoming signal via input channel 102 and in response generate four output signals $300_1$, $300_2$, $300_3$, $300_4$ delivered respectively from phase modulators $550_1$, $550_2$, $550_3$, $550_4$. In accordance with embodiments of the present invention, by varying the relative phases of the optical signals travelling through the channels, the output optical signal of phased array 500, which is the result of combination of or interference between signals $300_1$, $300_2$, $300_3$, $300_4$, may be controlled or steered in different directions. The phase of the optical signal travelling through each optical path $125_i$, where i is an integer varying from 1 to 4 in this exemplary embodiment, is modulated by an associated phase modulator $550_1$ using a control signal $P_i$ external to the phased array.

Figure 6:
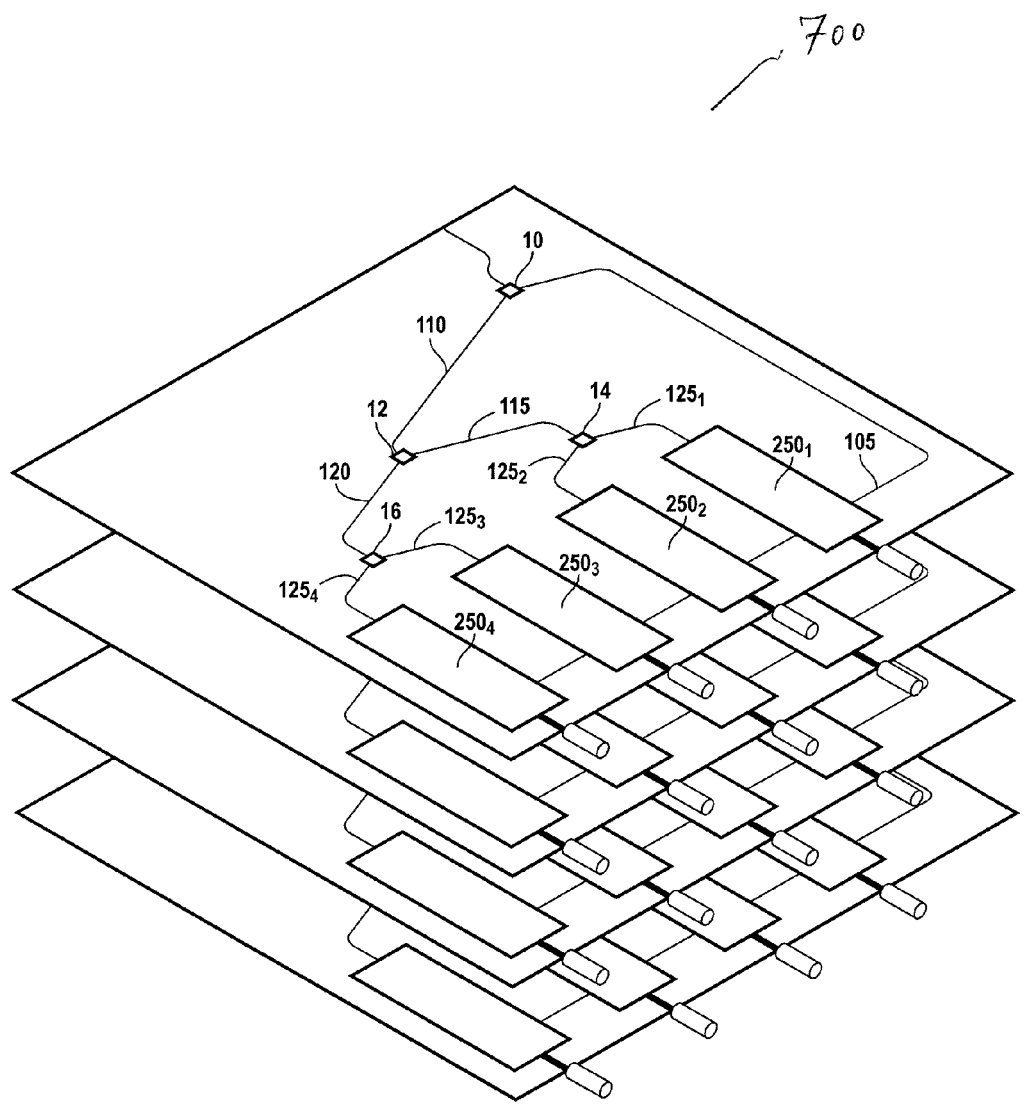
FIG. 6 is a block diagram of a vertical stack of a multitude of integrated optical phased array of FIG. 2 or 5, in accordance with one exemplary embodiment of the present invention.

An integrated optical phased-array, such as integrated optical phased-array 100 may be used to form a larger optical phased array. For example, a multitude of integrated optical phased-arrays may be vertically stacked to form a larger array. FIG. 6 is a block diagram of an exemplary two-dimensional optical phased array 700 formed by vertically stacking four substrates each having disposed thereon an integrated optical phased array 100 or 500, in accordance with one embodiment of the present invention. Optical phased-array 700 thus includes 16 signal processing channels arranged in a 4×4 array.

In one embodiment, the 16 output signals of the 16 processing channels of FIG. 6 are delivered by 16 edge emitters placed in close proximity of one another. Using such closed spaced edge emitters together with the use of thin substrates on which the four linear phased array are integrated, results in the formation a highly compact two-dimensional optical phased array that has a substantially reduced size and footprint.

The above embodiments of the present invention are illustrative and not limitative. Embodiments of the present invention are not limited by the number of processing channels in an array or by the number of arrays used to form a multi-dimensional stack. Embodiments of the present invention are not limited by the type of amplitude modulation, phase modulation, photo detection, control circuitry, or the like used in the phase array. Embodiments of the present invention are not limited by the type of optical coupler, splitter, router, waveguide crossing, or the like used in the phased array. Embodiments of the present invention are not limited by the wavelength of the incoming optical signal, nor are they limited by the type of substrate, semiconductor or otherwise, in which the optical phased array may be formed. Other additions, subtractions or modifications are obvious in view of the present disclosure and are intended to fall within the scope of the appended claims.

What is claimed is:

1. An integrated optical phased array comprising:
an input channel adapted to receive an optical input signal;
an amplitude control circuit;
a phase control circuit;
a first coupler/splitter adapted to split the optical input signal into a first portion of the optical input signal and a second portion of the optical input signal;
a first signal processing channel adapted to supply a first optical output signal in response to the second portion of the optical input signal, the first signal processing channel comprising:
a first optical path carrying a third optical signal and comprising a first photo detection circuit adapted to generate a first detected signal in response to the third optical signal, said first detected signal being applied to the amplitude control circuit;
a second optical path carrying a fourth optical signal and comprising a first amplitude modulation block adapted to modulate an amplitude of the fourth optical signal in accordance with a first control signal the amplitude control circuit generates in response to the first detection circuit;
a third optical path carrying a fifth optical signal and comprising a second photo detection circuit adapted to generate a second detection signal in response to the fifth optical signal, said second detected signal being applied to the phase control circuit; and
a fourth optical path carrying a sixth optical signal and comprising a first phase modulation block adapted to modulate a phase of the sixth optical signal in accordance with a second control signal the phase control circuit generates in response to the second detected signal, wherein said third, fourth, fifth and sixth optical signals are generated from the second portion of the optical input signal via a first plurality of splitters/couplers;
a second signal processing channel adapted to supply a second optical output signal in response to the second portion of the optical input signal, the second signal processing channel comprising:
a fifth optical path carrying a seventh optical signal and comprising a third photo detection circuit adapted to generate a third detected signal in response to the seventh optical signal, said third detected signal being applied to the amplitude control circuit;
a sixth optical path carrying an eighth optical signal and comprising a second amplitude modulation block adapted to modulate an amplitude of the eighth optical signal in accordance with a third control signal the amplitude control circuit generates in response to the third detected signal;
an seventh optical path carrying a ninth optical signal and comprising a fourth photo detection circuit adapted to generate a fourth detected signal in response to the ninth optical signal, said fourth detected signal being applied to the phase control circuit; and a ninth optical path carrying a tenth optical signal and comprising a second phase modulation block adapted to modulate a phase of the tenth optical signal in accordance with a fourth control signal the phase control circuit generates in response to the fourth detected signal, wherein said seventh, eight, ninth and tenth optical signals are generated from the second portion of the optical input signal via a second plurality of splitters/couplers.

2. The integrated optical phase array of claim 1 wherein said first amplitude modulation block is adapted to modulate the amplitude of fourth optical signal by varying a phase of the fourth optical signal.

3. The integrated optical phase array of claim 1 wherein said third and optical signals are generated from a first one of the first plurality of splitters/couplers.

4. The integrated optical phase array of claim 1 wherein said third optical signal is generated from the fourth optical signal.

5. The integrated optical phase array of claim 4 wherein said third and sixth optical signals have substantially similar phases and different amplitudes.

6. The integrated optical phase array of claim 5 wherein said fifth optical signal is further defined by an output signal of the first phase modulation block.

7. The integrated optical phase array of claim 1 wherein said third optical signal is generated from the associated third and fourth and sixth optical signals.

8. The integrated optical phase array of claim 7 wherein said fourth and sixth optical signals have substantially similar phases.

9. The integrated optical phase array of claim 8 wherein said fourth and sixth optical signals are generated by a first one of the plurality of first splitters splitting the second portion of the optical input signal.

10. The integrated optical phase array of claim 1 wherein said first photo detection circuit is a photo diode.

11. The integrated optical phase array of claim 10 wherein said second photo detection circuit is a photo diode.

12. The integrated optical phase array of claim 1 wherein said first and second processing channels form a first plurality of processing channels, the integrated optical phase array further comprising:
a second plurality of signal processing channels positioned above the first plurality of signal processing channels.

13. The integrated optical phase array of claim 12 further comprising:
a third plurality of signal processing channels positioned below the first plurality of signal processing channels.

14. A method of steering an optical signal by varying relative phases of a plurality of output signals generated by a first plurality of optical signal processing channels, the method comprising:
delivering an optical input signal to an input channel;
splitting the optical input signal into a first portion of the optical input signal and a second portion of the optical input signal;
generating third, fourth, fifth, sixth, seventh, eighth, ninth and tenth optical signals from the second portion of the optical input signal;
generating a first detect signal in response to the third optical signal travelling through a first optical path;
applying the first detect signal to an amplitude control circuit;
modulating an amplitude of the fourth optical signal travelling through a second optical path and in accordance with a first control signal generated by the amplitude control circuit;
generating a second detect signal in response to the fifth optical signal travelling through a third optical path;
applying the second detect signal to a phase control circuit;
modulating a phase of the sixth optical signal travelling through a fourth optical path in accordance with a first control signal generated by the phase control circuit;
generating a third detect signal in response to the seventh optical signal travelling through a fifth optical path;
applying the third detect signal to the amplitude control circuit;
modulating an amplitude of the eighth optical signal travelling through a sixth optical path and in accordance with a second control signal generated by the amplitude control circuit;
generating a fourth detect signal in response to the ninth optical signal travelling through a seventh optical path;
applying the fourth detect signal to the phase control circuit; and
modulating a phase of the tenth optical signal travelling through an eighth optical path in accordance with a second control signal generated by the phase control circuit.

15. The method of claim 14 further comprising:
modulating an amplitude of the fourth optical signal by varying a phase of the third optical signal.

16. The method of claim 14 further comprising:
generating the first and fourth optical signals by splitting a signal defined by the amplitude modulated signal.

17. The method of claim 14 further comprising:
generating the third optical signal from the fourth optical signal.

18. The method of claim 17 further comprising:
maintaining the third and sixth optical signals substantially in phase.

19. The method of claim 18 further comprising:
generating the fifth optical signal in accordance with the sixth optical signal.

20. The method of claim 14 further comprising:
coupling the fourth and sixth optical signals to generate the third optical signal.

21. The method of claim 20 further comprising:
maintaining the fourth and sixth optical signals substantially in phase.

22. The method of claim 21 further comprising:
splitting second portion of the optical input signal to generate the fourth and sixth optical signals.

23. The method of claim 14 further comprising:
generating the first detect signal using a first photo diode.

24. The method of claim 23 further comprising:
generating the second detect signal using a second photo diode.

25. The method of claim 14 wherein said first, second, third, fourth, fifth, sixth, seventh and eight optical paths form a first substantially planar plurality of signal processing channels, the method further comprising:
forming a second plurality of signal processing channels above the first plurality of signal processing channels.

26. The method of claim 25 further comprising:
forming a third plurality of signal processing channels below the first plurality of signal processing channels.

* * * * *